June 6, 1933. V. F. ZAHODIAKIN 1,913,063
INTERNAL COMBUSTION ENGINE
Filed Oct. 19, 1931 3 Sheets-Sheet 1
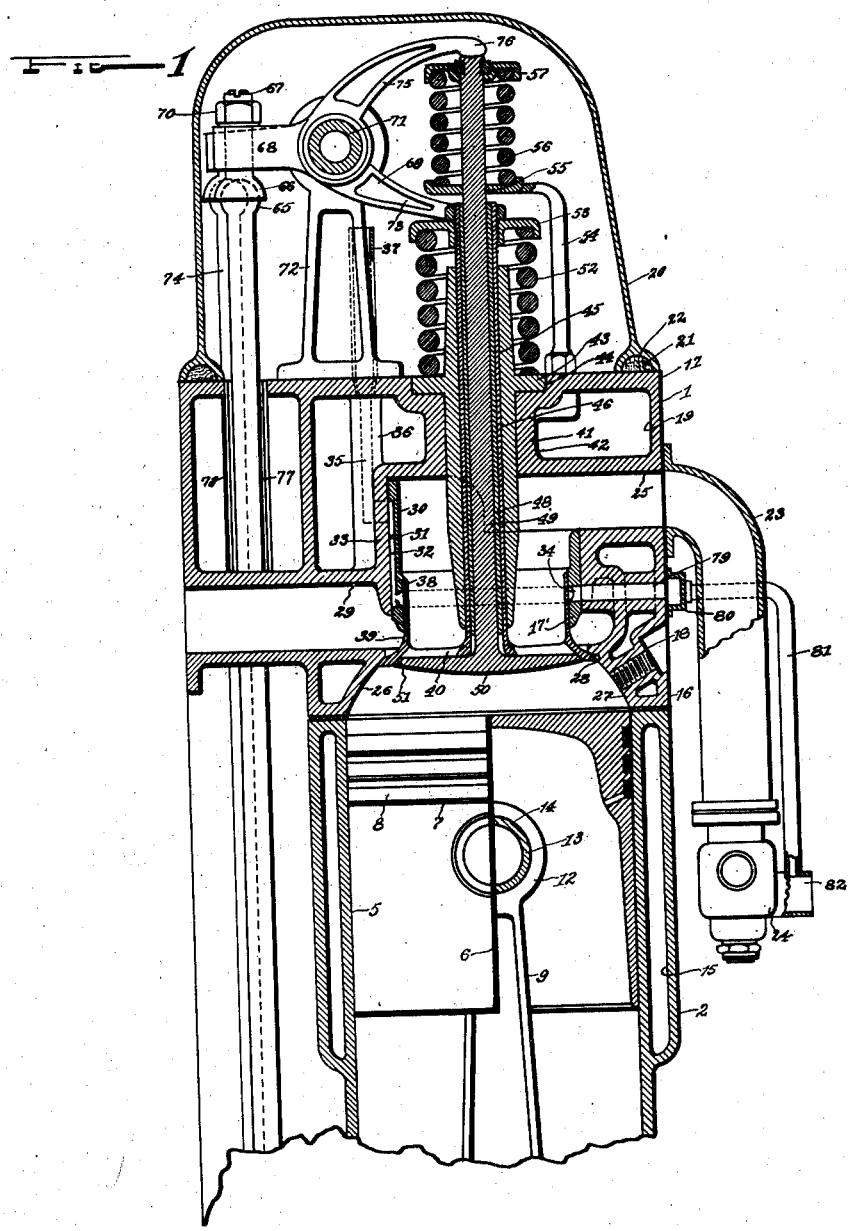
INVENTOR.
Victor F. Zahodiakin
BY
ATTORNEY.

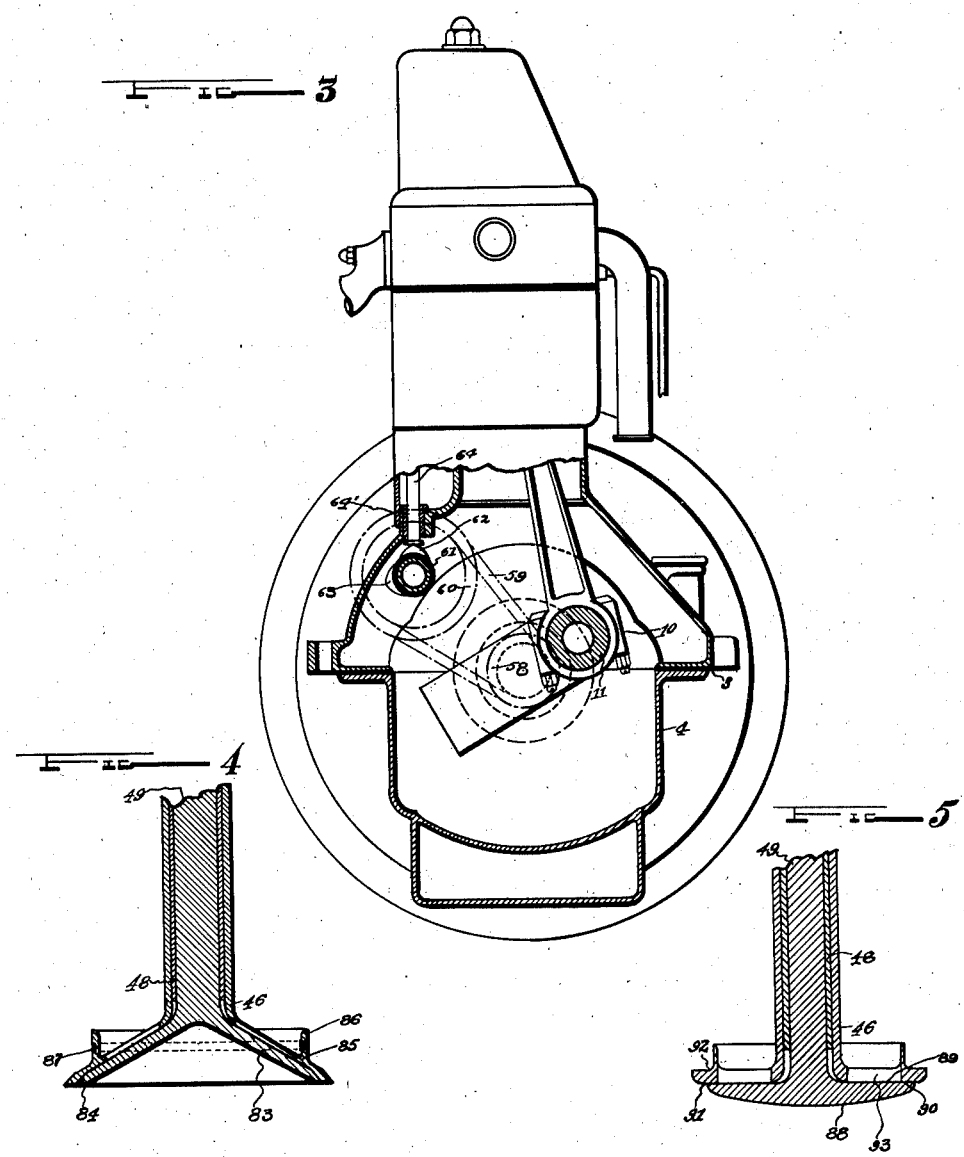

June 6, 1933.    V. F. ZAHODIAKIN    1,913,063
INTERNAL COMBUSTION ENGINE
Filed Oct. 19, 1931    3 Sheets-Sheet 3
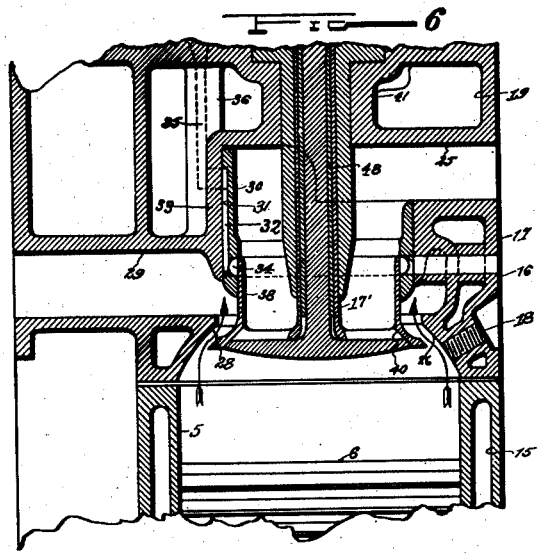
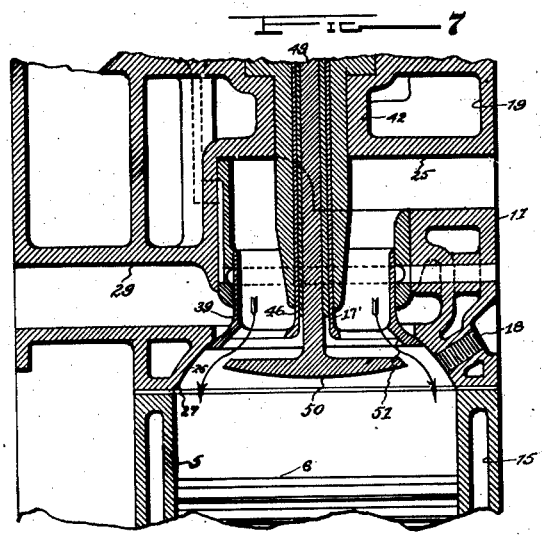
Victor F. Zahodiakin
INVENTOR.
BY
ATTORNEY.

Patented June 6, 1933

1,913,063

UNITED STATES PATENT OFFICE

VICTOR F. ZAHODIAKIN, OF CINCINNATI, OHIO

INTERNAL COMBUSTION ENGINE

Application filed October 19, 1931. Serial No. 569,717.

The invention relates to internal combustion engines.

Various internal combustion engines in which have been employed poppet or small valves for the respective cylinders, the excessive heat of the exploded gases within the cylinders, during the explosion stroke, produces great damage to the valves and their seat. Also, excessive heat facilitates in the collection and accumulation of carbon deposits on the valves and their stems and in the valve guides. Therefore, the power capable of being developed by the engine is importantly decreased as a result of these disadvantages.

Therefore, the objects of the invention are to provide an internal combustion engine adapted to operate with great simplicity, efficiency, and durability; to provide an engine which may be constructed at low cost; to provide means adapted to render said engine silent while operating, unlikely to require frequent replacement or repairs of certain parts, such as the valves and their seats; to provide an engine adapted to develop maximum power and speed; to provide exhaust and inlet valves having large area to reduce the power required to introduce the vaporized fuel into the cylinders and exhaust the burned gases therefrom; to provide means to cool and lubricate the valves whereby carbon is unlikely to accumulate; to provide means whereby said engine is adapted to operate smoothly with minimum vibration; to provide simple, efficient and practical means for the introduction of vaporized fuel into the cylinders and discharge of burned gases therefrom; to provide an engine having large valves and having a construction adapted when the burned gases are exhausted from said engine to remove all foreign matter and materials therefrom, whereby said engine is adapted to remain clean; and to provide means whereby the inlet charge of fuel will maintain the valves and other parts at a low temperature.

Other objects are made apparent by reference to the drawings, and the hereinafter description.

The invention resides in certain novel features, the combination, arrangement of the parts and in the details of the construction, as will be more fully hereinafter described and claimed.

In the drawings:

Fig 1 is a vertical transverse section of the invention;

Fig. 2 is a bottom view of the circular exhaust valve;

Fig. 3 is an end elevational view of the invention, with parts broken away, and showing parts in dotted lines;

Fig. 4 is a vertical section showing a modified form of the compound valve;

Fig. 5 is a vertical section showing still another modified form of the compound valve;

Fig. 6 is a vertical section, with parts broken away, showing the valve in position during the exhaust stroke of the piston;

Fig. 7 is a similar sectional view showing the valve in position during the inlet stroke of the piston.

In the preferred construction of the invention I provide the internal combustion engine 1 comprising the engine block 2 having suitably fixed to its lower side 3 the usual crank case 4.

The block 2 is provided with the usual cylinders 5 which extend from the bottom to the top of the block. In the cylinders are fitted the usual reciprocating pistons 6, having therein the circumferential grooves 7 into which are fitted the usual piston rings 8. The usual connecting rods 9 have their lower ends 10 mounted in the bearings of the crank shaft 11 which is rotatably mounted in the usual main bearings of the crank case 4. The upper ends 12 of the connecting rods 9 are rotatably mounted upon the usual wrist pins 13 rotatably mounted in the bearings 14 within the pistons 6.

Surrounding the cylinders 5 is the usual water jacket 15 for the usual purpose of containing water for the purpose of maintaining a low temperature of the engine. In the side 16 of the engine head 17 is the opening 18 communicating with the cylinder. The usual spark plugs are screwed into the opening 18 and have the usual connection with the usual ignition system adapted for use in producing sparks from the spark plugs to ignite the vapor fuel within the cylinder.

The invention resides in the engine head 17, the compound valve 17' and other parts hereinafter described. The head 17 is suitably fixed to the top of the engine block 2. In the head are the usual water jackets 19. Suitably fixed to the top of the head 17 is the cylinder head cover or casing 20 having the packing 21 in the groove 22 in its lower edge to provide an air-tight fit of the casing with the head.

Communicating with the usual intake supply pipe 23, which has usual connection with a carburetor 24, is the intake chamber or passage 25 in the head 17.

In the head 17 is the vertical opening 26, the lower portion of which communicates with and is in alignment with the upper portion of the cylinder 5. The lower portion of the walls 27 of the vertical opening 26 are inclined inwardly and upwardly to form the head or exhaust valve seat 28 positioned slightly below the exhaust passage 29 which leads through the head 17 and communicates with the vertical opening 26.

Fixed in the upper portion of the vertical opening 26 is the cylindrical valve guide 30 having the depression 31 in its outer side whereby the chamber 32 is formed between the valve guide and the web 33 of the engine head 17. In the inner surface of the valve guide is the groove 34 whose walls extend horizontally and circumferentially of the guide. Communicating with the chamber 32 is the hole 35, which passes through the webs 33 and 36 of the head 17. The hole 35 has received in its upper end the pipe 37 which extends upwardly into the casing 20.

Slidably mounted in the valve guide 30 is the upwardly extending flanges 38 integral with the tubular or exhaust valve 39 having integrally formed with its lower end the circular or exhaust valve head 40 adapted to seat in the exhaust seat 28 for the purpose of closing the vertical opening 26 with respect to the exhaust passage 29, as hereinafter fully described. The flanges 38 of the tubular valve seals the circumferential groove 34.

Fixed in the web 41 of the head 17 is the vertical tubular support 42 having integrally formed therewith the outwardly and horizontally extending flange 43 which fits into the depression 44 in the top of the web 41. Slidable in the hole 45 of the vertical support 42 is the tubular exhaust valve stem 46 having integrally formed with its lower end the circular or exhaust valve head 40 having the spaced apart apertures 47 therein. Fixed within the tubular valve stem 46 is the bushing 48 in which is slidably mounted a vertical inlet valve stem 49 having integrally formed with its lower end the inlet valve head 50 adapted to seat in contact with the inlet seat 51 formed in the inner portion of the lower end of the exhaust valve head 40.

Surrounding the upper end of the vertical support 42 is the coil spring 52 having its lower end contacting the flange 43 and having its upper end in contact with the spring retainer 53 which is fixed to the upper end of the tubular valve stem 46. The coil spring is adapted to urge the tubular valve stem upwardly thereby forcing the exhaust valve head 40 in contact with its seat 28. Suitably fixed to the upper surface of the web 41 is the vertical arm 54 having its upper end bent inwardly and horizontally and having a hole 55 therein through which the valve stem 49 extends. Surrounding the upper end of the valve stem 49 is the coil spring 56 having its upper end in contact with the spring retainer 57 suitably fixed to the upper end of the valve stem 49. The spring 56 urges the valve stem upwardly thereby causing the inlet valve head 50 to contact its seat 51.

Suitably secured to the crank shaft 11 is the sprocket wheel 58, shown in dotted lines in Fig. 3, and having the sprocket chain 59 thereon which meshes with the sprocket wheel 60 suitably fixed to the cam shaft 61 rotatably mounted in suitable bearings within the crank case. On the cam shaft are fixed the spaced apart exhaust and inlet cams 62 and 63. As shown in Fig. 3 the exhaust cam 62 is adapted to contact the lower end of the exhaust push rod 64, slidably mounted in the bearings 64' in the crank case. Integrally formed with the upper end of the exhaust push rod 64 is the ball 65 adapted to fit into the socket 66 having integrally formed therewith the vertical bolt 67 which extends upwardly through the rear end 68 of the rocker arm 69 and fixed thereto, as by the nut 70.

The rocker arm 69 is rotatably mounted upon the horizontal shaft 71 suitably fixed to the upper end of the vertical support 72 which is suitably fixed to the top of the engine head. Engagement of the exhaust cam 62 with the lower end of the exhaust push rod 64 causes the pawl 73, integral with the rocker arm, to contact the upper end of the exhaust valve stem 46 and force the valve stem downwardly thereby causing the exhaust valve head 40 to be removed from its seat 28 during the exhaust stroke of the piston 6, as shown in Fig. 6.

Similarly mounted in the engine head 17 is the intake push rod 74 whose lower end is adapted to be contacted by the intake cam 63, whereby the push rod is intermittently forced upwardly. The upper end of the intake push rod contacts the rear end of the rocker arm 75 and forces it upwardly thereby causing the pawl 76, whose outer end is in contact with the top of the intake valve stem 49 downwardly, thereby causing the intake valve head 50 to be removed from its seat 51, as shown in Fig. 7, to permit gases to enter the cylinder 5 through the apertures 47 in the exhaust head 40 from the intake passage 25 during the intake stroke of said piston. Since the exhaust cam 62 is not in contact with the exhaust push rod 64, during this operation, the spring 52 is adapted to urge the exhaust valve stem upwardly which results in the exhaust valve head 40 contacting its seat, and the flange 17' closes the exhaust passage 29.

During the compression and explosion strokes of the engine neither the exhaust push rod nor the inlet push rod is contacted by the exhaust and inlet cams, whereby the springs 52 and 56, respectively, are adapted to urge the valve stems 46 and 49 upwardly thereby causing the valve heads 40 and 50 to engage their seats and close the exhaust and inlet passages, with respect to the cylinder 5.

The space 77 between the head 17 and the exhaust push rod 64, in the vertical web 78, permits the circulation of oil mist and air from the crank case 4 into the casing 20 whereby suction or vacuum from the carburetor 24 causes the oil mist and air to pass through the vertical pipe 37, hole 35, chamber 32, groove 34 and into the horizontal hole 79 in the head, having communication with the groove 34, whereby the upwardly extending flange 38 of the tubular valve 39 is efficiently lubricated, and at the same time maintained at a low temperature. The union 80, fixed to the side of the engine head, communicates with the hole 79, and has fixed thereto the L-shape pipe 81 whose lower end communicates with the air chamber 82 of the carburetor 24.

In Fig. 4 is shown a modified form of the invention showing the conical inlet valve head 83 having its upper side in contact with the inlet seat 84 in the lower edge of the conical exhaust valve head 85 having integrally formed with its upper edge the vertical flange 86 having therein the compression or oil rings 87 adapted to contact the inner surface of the valve guide 30 for the purpose of preventing escape of gases from the cylinder 5 during the exhaust stroke of the piston.

Fig. 5 shows another modification of the invention in which the inlet valve head 88 is shown having a horizontal upper surface 89 adapted to contact the seat 90 formed in the lower horizontal surface 91 of the exhaust valve head 92 having the apertures 93 therein for the purpose of permitting fuel to pass therethrough during the intake stroke of the piston.

An advantage of the invention is that the exhaust and inlet openings which communicate with the cylinder 5, have large area, with relation to the size of the cylinder, whereby power capable of being developed by the engine and the speed at which the engine is adapted to operate is relatively great.

Another advantage of the invention is that the lower portion of the vertical opening 26 has its walls extending inwardly and upwardly which are adapted to remain clean and without accumulation of carbon, because the exhaust gases can readily escape.

Still another advantage of the invention is that the exhaust and inlet valves are adapted to remain at a low temperature, during the operation of the engine, particularly because the inlet charges of fuel pass in contact with the surface of both the inlet and exhaust valves.

Still another advantage of the invention is that since the exhaust and intake valves are adapted to operate at low temperature, carbon is not likely to collect thereon. Also, efficient operation and long usage of the valve heads and their seats are assured without necessity of regrinding, or replacement of parts.

Still another advantage of the invention is that the exhaust valve may be adjusted so that it will remain open near or at the bottom dead center of the piston stroke, whereby the engine is adapted to develop considerable power with relation to the consumption of fuel. Also, the distance through which the valves are required to travel during their operation is relatively small, whereby the engine is adapted to operate smoothly without excessive vibration.

While I believe that the form of the invention illustrated in the drawings and referred to in the above description, as the preferred embodiment, is efficient and practicable, yet realizing that the conditions concurrent with the adoption of the device will necessarily vary, I desire to emphasize the fact that changes in the details may be resorted to, when required, without sacrificing any of the advantages of the invention, as defined in the claims.

Various changes might be made in the general form and arrangement of parts described without departing from the invention, and hence I do not limit myself to the precise details of the materials or the size and shape thereof as set forth, but I am at liberty to make such changes and alterations that fall within the spirit and scope of the appended and final claims.

What I claim as new and desire to secure by Letters Patent is:

1. In an internal combustion engine, the combination with an engine block having a cylinder having a reciprocating piston therein adapted to make compression, explosion, exhaust and intake strokes, and a crank case fixed to the bottom of said block, and a carburetor fixed to said engine, of an engine head fixed to said block and having a vertical opening therein communicating and in alignment with said cylinder, and having an exhaust passage and an inlet passage communicating with said opening, and having an exhaust valve seat in said opening intermediate said cylinder and said exhaust and inlet passages, a casing on said head, communicating means between said carburetor and said inlet passage, a cylindrical valve guide fixed vertically in said opening and having a depression in its outer side whereby a chamber is formed between said valve guide and said head, said guide having a groove in its inner surface, said groove having walls which extend circumferentially of said guide and horizontally, said groove communicating with said chamber, an exhaust valve having vertical flanges slidably mounted in said guide adjacent said groove and having a circular exhaust valve head on its lower end adapted to seat in contact with said exhaust seat to close the lower part of said opening with respect to said exhaust passage, said exhaust valve head having spaced apart apertures therein and having an inlet valve seat formed in its lower inner surface, a vertical valve support fixed in said head and having an outwardly extending flange and having its lower end extending within the center of said valve guide and having a hole therethrough, a vertical tubular staff having its lower end integrally connected with said exhaust valve head, a tubular bushing positioned inside said staff, a vertical inlet valve stem slidable in said bushing and having an inlet valve head fixed to its lower end and adapted to seat in contact with said inlet valve seat, a coil spring surrounding said support and having its lower end contacting said flange, a spring retainer fixed to the upper end of said staff and contacted by said last mentioned means to urge said exhaust valve head in contact with said exhaust valve seat during the compression and intake strokes of said piston, an arm fixed to said head, a coil spring on said arm and surrounding said valve stem, a spring retainer fixed to the upper end of said stem and contacting the upper end of said last mentioned coil spring, whereby said inlet valve head is urged in contact with said inlet valve seat during the compression and exhaust strokes of said piston, and means whereby during the intake stroke of said piston said inlet valve stem is forced downwardly and thereby removes said inlet valve head from said inlet valve seat to permit fuel to pass through said inlet passage and into said cylinder, means whereby said staff is forced downwardly and thereby removes said exhaust valve head from contact with said exhaust seat during the exhaust stroke of said piston to permit escape of gases from said cylinder, a pipe in said head having its lower end communicating with said chamber and having its upper end communicating with said casing, and communicating means from said groove and said carburetor whereby oil mist and air are drawn through said first mentioned pipe, said chamber, and said groove, substantially as and for the purposes described.

2. In an internal combustion engine, the combination with an engine block having a cylinder having a reciprocating piston therein adapted to make compression, explosion, exhaust and intake strokes, and a crank case fixed to the bottom of said block, and a carburetor fixed to said engine, of an engine head fixed to said block and having an opening therein communicating with said cylinder, and having an exhaust passage and an inlet passage communicating with said opening, and having an exhaust valve seat in said opening intermediate said cylinder and said exhaust passage, a casing on said head, communicating means between said carburetor and said inlet passage, a valve guide fixed in said opening and having a depression in its outer side whereby a chamber is formed between said valve guide and said head, said guide having a groove in its inner surface, said groove having walls which extend circumferentially of said guide, said groove communicating with said chamber, an exhaust vave having flanges slidably mounted in said guide adjacent said groove and having an exhaust valve head on its lower end adapted to seat in contact with said exhaust seat to close the lower part of said opening with respect to said exhaust passage, said exhaust valve head having spaced apart apertures therein and having an inlet valve seat formed in its lower inner surface, a vertical valve support fixed in said head and having an outwardly extending flange and having its lower end extending within the center of said valve guide and having a hole therethrough, a vertical tubular staff having its lower end integrally connected with said exhaust valve head, a vertical inlet valve stem slidable and having an inlet valve head fixed to its lower end and adapted to seat in contact with said inlet valve seat, means surrounding said support and having its lower end contacting said flange, means fixed to the upper end of said staff and contacted by said last mentioned means to urge said exhaust valve head in contact with said exhaust valve seat during the compression and intake strokes of said piston, means surrounding said valve stem, means fixed to the upper end of said stem and contacting the upper end of said last mentioned means, whereby said inlet valve head is urged in contact with said inlet valve seat during the compression and exhaust strokes of said piston, and means whereby during the intake stroke of said piston said inlet valve stem is forced downwardly and thereby removes said inlet valve head from said inlet valve seat to permit fuel to pass through said inlet passage and into said cylinder, means whereby said staff is forced downwardly and thereby removes said exhaust valve head from contact with said exhaust seat during the exhaust stroke of said piston to permit escape of gases from said cylinder, means communicating with said chamber and with said casing, and communicating means from said groove and said carburetor whereby oil mist and air are drawn through said first mentioned means, said chamber, and said groove, substantially as and for the purposes described.

3. In an internal combustion engine, the combination with an engine block having a cylinder having a reciprocating piston therein adapted to make compression, explosion, exhaust and intake strokes, and a crank case fixed to the bottom of said block, and a carburetor fixed to said engine, of an engine head fixed to said block and having a vertical opening therein communicating and in alignment with said cylinder, and having an exhaust passage and an inlet passage communicating with said opening, and having an exhaust valve seat in said opening and said inlet passage, a casing on said head, communicating means between said carburetor and said inlet passage, a cylindrical valve guide fixed vertically in said opening and having a depression in its outer side whereby a chamber is formed between said valve guide and said head, said guide having a groove in its inner surface, said groove having walls which extend circumferentially of said guide and horizontally, said groove communicating with said chamber, an exhaust valve having vertical flanges slidably mounted in said guide adjacent said groove and having a circular exhaust valve head on its lower end adapted to seat in contact with said exhaust seat to close the lower part of said opening with respect to said exhaust passage, said exhaust valve head having an inlet valve seat formed in its lower inner surface, a vertical valve support fixed in said head and having an outwardly extending flange and having its lower end extending within said valve guide and having a hole therethrough, a vertical tubular staff having its lower end integrally connected with said exhaust valve head, a tubular bushing positioned inside said staff, a vertical inlet valve stem slidable in said bushing and having an inlet valve head fixed to its lower end and adapted to seat in contact with said inlet valve seat, a coil spring surrounding said support and having its lower end contacting said flange, a spring retainer fixed to the upper end of said staff and contacted by said last mentioned means to urge said exhaust valve head in contact with said exhaust valve seat during the compression and intake strokes of said piston, an arm fixed to said head, a coil spring on said arm and surrounding said valve stem, a spring retainer fixed to the upper end of said stem and contacting the upper end of said last mentioned coil spring, whereby said inlet valve head is urged in contact with said inlet valve seat during the compression and exhaust strokes of said piston, and means whereby during the intake stroke of said piston said inlet valve stem is forced downwardly and thereby removes said inlet valve head from said inlet valve seat to permit fuel to pass through said inlet passage and into said cylinder, means whereby said staff is forced downwardly and thereby removes said exhaust valve head from contact with said exhaust seat during the exhaust stroke of said piston to permit escape of gases from said cylinder, a pipe in said head having its lower end communicating with said chamber and having its upper end communicating with said casing, and communicating means from said groove and said carburetor whereby oil mist and air are drawn through said first mentioned pipe, said chamber, and said groove, substantially as and for the purposes described.

4. In an internal combustion engine, the combination with an engine block having a cylinder having a reciprocating piston therein adapted to make compression, explosion, exhaust and intake strokes, and a crank case fixed to the bottom of said block, and a carburetor fixed to said engine, of an engine head fixed to said block and having an opening therein communicating with said cylinder, and having an exhaust passage and an inlet passage communicating with said opening, and having an exhaust valve seat in said opening, a casing on said head, communicating means between said carburetor and said inlet passage, a valve guide fixed in said opening and having a depression in its outer side whereby a chamber is formed between said valve guide and said head, said guide having a groove in its inner surface, said groove having walls which extend circumferentially of said guide, said groove communicating with said chamber, an exhaust valve having flanges slidably mounted in said guide adjacent said groove and having an exhaust valve head on its lower end adapted to seat in contact with said exhaust seat to close the lower part of said opening with respect to said exhaust passage, said exhaust valve head having an inlet valve seat formed in its lower inner surface, a vertical valve support fixed in said head and having an outwardly extending flange and having its lower end extending within said valve guide and having a hole therethrough, a vertical tubular staff having its lower end integrally connected with said exhaust valve head, a vertical inlet valve stem slidable and having an inlet valve head fixed to its lower end and adapted to seat in contact with said inlet valve seat, means surrounding said support and having its lower end contacting said flange, means fixed to the upper end of said staff and contacted by said last mentioned means to urge said exhaust valve head in contact with said exhaust valve seat during the compression and intake strokes of said piston, means surrounding said valve stem, means fixed to the upper end of said stem and contacting the upper end of said last mentioned means, whereby said inlet valve head is urged in contact with said inlet valve seat during the compression and exhaust strokes of said piston, and means whereby during the intake stroke of said piston said inlet valve stem is forced downwardly and thereby removes said inlet valve head from said inlet valve seat to permit fuel to pass through said inlet passage and into said cylinder, means whereby said staff is forced downwardly and thereby removes said exhaust valve head from contact with said exhaust seat during the exhaust stroke of said piston to permit escape of gases from said cylinder, means communicating with said chamber and with said casing, and communicating means from said groove and said carburetor whereby oil mist an air are drawn through said first mentioned means, said chamber, and said groove, substantially as and for the purposes described.

5. In an internal combustion engine, a body including a cylinder block and a cylinder head, a piston in said cylinder, an exhaust passageway extending from the cylinder of said block and including a seat, an exhaust valve adapted to be engaged on said seat, said valve including a stem slidably mounted in said body, a cylindrical flange concentrically formed on the valve, said flange surrounding and spaced from the valve stem, said flange slidably mounted in the body, a circumferential groove in the bore mounting said cylindrical flange, an oil mist supply conduit extending to said groove, a conduit extending from said groove, and means for creating suction in said conduit.

6. In an internal combustion engine, a body including a cylinder block and a cylinder head, a piston in said cylinder, a carburetor for supplying gas to said cylinder, an exhaust passageway extending from said cylinder and including a seat, an exhaust valve adapted to be engaged on said seat, mechanism for operating the said valve, an enclosure for said mechanism, means for mounting said valve, a cylindrical flange concentrically formed on the valve, said cylindrical flange slidably mounted in a bore of the body, a circumferential groove in said bore disposed around said cylindrical flange, an oil mist supply conduit extending from within the enclosure for the valve operating mechanism, and a suction conduit extending from said groove to the carburetor inlet.

VICTOR F. ZAHODIAKIN.